United States Patent [19]

Blanding

[11] 4,012,793

[45] Mar. 15, 1977

[54] MULTIORIENTED COMPOSITE-SURFACE TAPE GUIDE FOR USE IN A CASSETTE

[75] Inventor: Douglass L. Blanding, Leroy, N.Y.

[73] Assignee: Eastman Kodak Company, Rochester, N.Y.

[22] Filed: Aug. 22, 1975

[21] Appl. No.: 607,002

[52] U.S. Cl. .............................. 360/130; 242/194; 360/85; 360/95

[51] Int. Cl.² .................. G11B 23/04; G11B 15/66; G11B 5/52

[58] Field of Search .............. 360/85, 95, 130, 132; 242/193–194, 197–200, 55.19 A; 226/76, 191, 192, 189, 174

[56] References Cited

UNITED STATES PATENTS

| | | | |
|---|---|---|---|
| 3,042,331 | 7/1962 | Bierman | 242/55.13 |
| 3,263,936 | 8/1966 | Williams | 242/55.19 A |
| 3,635,414 | 1/1972 | Patel | 242/194 |
| 3,665,120 | 5/1972 | Larkin | 360/85 |
| 3,672,603 | 6/1972 | Swain | 242/194 |
| 3,673,348 | 6/1972 | Larkin | 360/85 |
| 3,678,213 | 7/1972 | Sato | 360/85 |
| 3,800,314 | 3/1974 | Sato | 360/85 |

*Primary Examiner*—Alfred H. Eddleman
*Attorney, Agent, or Firm*—R. Cody

[57] ABSTRACT

A guide having composite conical and cylindrical surfaces is provided within a coaxial-reel cassette for directing a magnetic tape along two different tape paths depending on whether the tape is wound within the cassette between the coaxial reels or is withdrawn from the cassette and wrapped around a helical recording drum. By obliquely orienting the conical surface with respect to the cylindrical surface, their composite juncture presents a smooth, continuous guiding surface. Such a guide translates the tape free of distortion directly between the reels by means of the cylindrical and conical surfaces together, or guidedly directs the tape to and from the recording drum, about which it helically wraps, by means of the cylindrical surface alone.

9 Claims, No Drawings

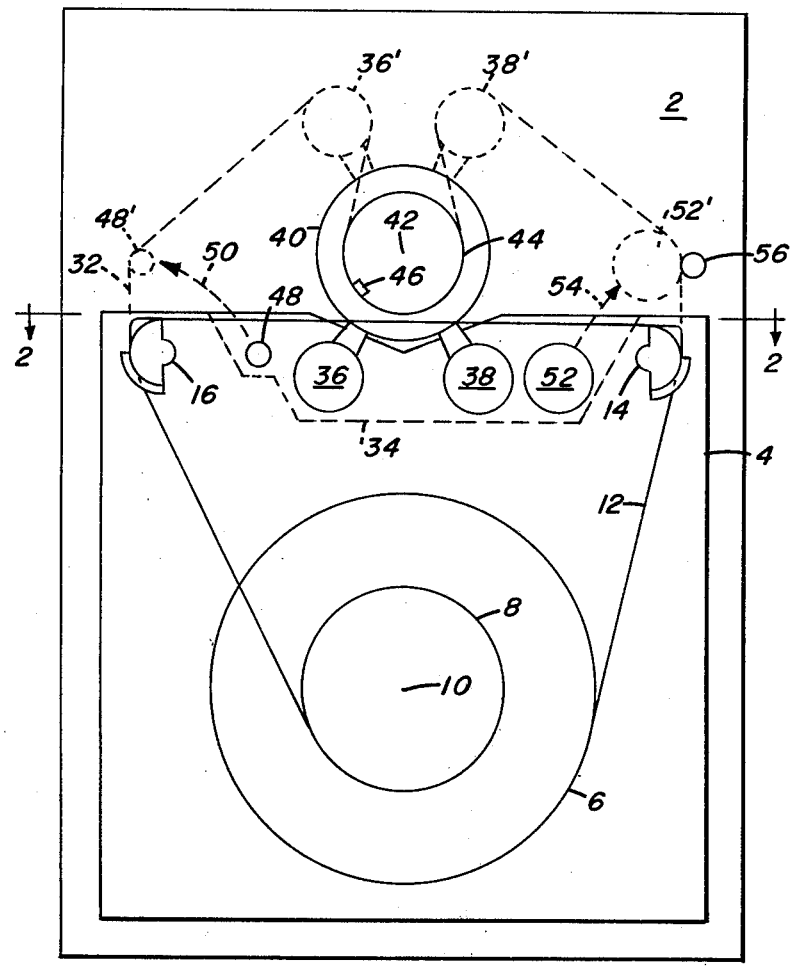
FIG. 1
FIG. 2
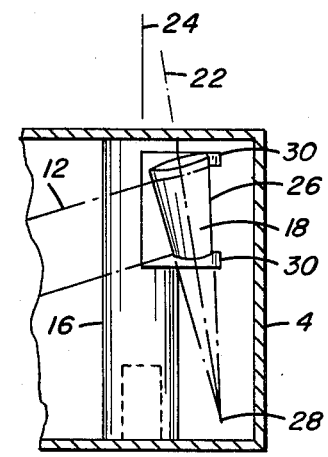
FIG. 3
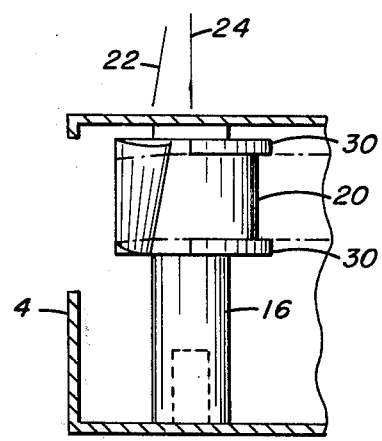
FIG. 4
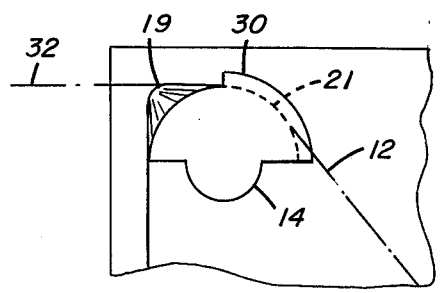
FIG. 5

MULTIORIENTED COMPOSITE-SURFACE TAPE GUIDE FOR USE IN A CASSETTE

CROSS-REFERENCE TO RELATED APPLICATIONS

The following applications are related to each other: U.S. patent application Ser. No. 606,995, filed Aug. 22, 1975, entitled "Rotatable Multifaceted Tape Guide for Use in a Cassette," by Thomas G. Kirn; U.S. patent application Ser. No. 607,001, filed Aug. 22, 1975, entitled "Cutaway Tape Guide for Selectively Cooperating with a Capstan and Guiding a Tape," by Douglass L. Blanding; U.S. patent application Ser. No. 606,994, filed Aug. 22, 1975, entitled "Yieldable, Coaxially-Driven Tape Wrapping Guides for Use in a Helical Tape Recorder," by Douglass L. Blanding.

BACKGROUND OF THE INVENTION

1. Field of the Invention

This invention relates in general to apparatus for guiding a tape through one, or another, tape path in a tape recorder; more particularly, the invention is concerned with guides which are mounted in a coaxial-reel tape cassette, for guiding magnetic tape selectively through different tape paths, including one path which is so disposed in the tape recorder that a television signal train may be helically recorded on the tape. (As used herein, the term "recorder" shall be taken to mean apparatus which either or both records or plays back video signal information.)

2. Description Relative to the Prior Art

While it is not so restricted, the invention acquires a special significance when it is used to guide magnetic tape contained in a coaxial-reel cassette toward and away from a helical recording drum in a video tape recorder. Coaxial-reel cassettes are particularly well adapted for use with video recorders, which generally tend to be bulky, since cassette takeup and supply reels are rotated on the same axis. As is usual, coaxial-reel cassettes will have a pair of inclined or tapered guide posts which are so oriented within the cassette as to take up the change in tape level between the reels when the tape, fully contained in the cassette, passes directly from one reel to the other.

For helical recording, the tape is initially pulled from the cassette and wrapped around the recording drum at a helix angle. In addition, the helical recording format requires precise positioning of the span of tape which passes around the drum; positioning errors may cause, for example, mistracking during playback. Tracking problems are diminished, however, if the tape follows a precise path into, around, and out of the drum assembly. In one video recorder configuration, the paths into and out of the drum are horizontal and substantially in the same plane as the supply and takeup reels, respectively. The last post before the tape touches the drum and the first post after the tape leaves the drum are designed to change the tape's horizontal level a few degrees so as to dispose the tape properly to form a helix around the drum.

These factors suggest the use of the coaxial-reel cassette with the helical drum assembly; however, this combination is hampered significantly because the tape presented to the helical drum is last touched within the cassette by the inclined or tapered guide posts. What this means is that the last guide surfaces within the cassette will tend to force the tape into an inclined path which is not suitable for presentment to the drum assembly and its associated guides. On the other hand, the tape still needs to be positively guided to the vicinity of the drum at the correct height for proper helical scanning. In an attempt to meet this problem, a multiplicity of guides are commonly provided on the recorder to positively guide the tape intermediate the cassette and the drum. The guides gradually compensate for the abrupt level change between the coaxial reels and finally present the tape at a suitable angle to the drum assembly. While perhaps expedient for a large machine, the size of such a guiding assembly plainly puts restraint on any effort to reduce bulkiness of a typical video tape recorder.

Since tape stability becomes such a formidable problem, the tape should be withdrawn from the cassette in such a manner as to keep the tape essentially free from being stressed differentially across its width as it encounters the cassette tape guides. The problem, therefore, becomes one of guiding the tape in an essentially distortion-free manner through either of two paths: a first path contained within the cassette, which imposes minimal stresses during high speed wind or rewind; a second path extending outside of the cassette which orients the tape to the drum assembly without introducing any stress differentials which would adversely affect the stability of the helix formed around the drum. The first path must additionally take up the level change between the two coaxial reels while the drum assembly and its associated guides account for the level change in the second path.

Approaches taken heretofore to guide tape between coaxial reels have provided tilted conical guide members for guiding a magnetic tape from a reel in one coaxial plane to a reel in another coaxial plane without stretching or distorting the tape, e.g., U.S. Pat. No. 3,042,331. Other arrangements have used cylindrical guides canted with respect to the axis of the reels, e.g., U.S. Pat. No. 2,706,638. These structures are intended for handling the tape between the reels, but they are commonly unsuited for positively guiding the tape in a distortion-free manner if the tape should be drawn away from the reels, as required by helical recording.

Various configurations have been proposed to produce both effects. These include guiding assemblies in the corner of a cassette composed of several posts — both upright and canted, e.g., U.S. Pat. No. 3,800,314. The tape winds its way from one post to another depending on whether the tape is to remain in the cassette or to be withdrawn from the cassette. However, in passing between this maze of posts, new stress differentials are likely to be impressed on the tape. Other suggestions have included a spring-loaded cassette post which is forced out of the tape path by a fixed post on the recorder deck when the cassette is emplaced on the recorder, e.g., U.S. Pat. No. 3,678,213. In such a manner, two separate guide posts are provided for two different paths. However, high speed winding with the tape contained in the cassette is hindered by the presence of the incorrect guide surface. Other proposals to provide separate guide surfaces for either path tend to occupy to much space within the cassette. Two cylindrical guides, one canted with respect to the coaxial reels, have been spaced apart in a corner of a cassette, e.g., U.S. Pat. No. 3,672,603. When the tape is withdrawn from the cassette, it rides away from the canted guide and is directed only by the upright guide. In addition to size considerations, such an arrangement does not lead to a contiguous guide structure, since making one guide contiguous to the other will leave irregular surfaces that may severely damage the tape.

A copending U.S. patent application Ser. No. 606,995, in the name of Thomas G. Kirn, filed concurrently with and assigned to the same assignee as the present application, provides a rotatable guide, for use within a coaxial-reel cassette, having right circular conical and cylindrical surfaces on opposite sides thereof. By providing such a guide, with appropriate selective orientation, a tape may be translated directly between the reels by means of the conical surface, or guidedly directed to and from a recording drum about which it helically wraps, by means of the cylindrical surface. Although this approach is an effort to meet the size question, the upright conical surface could contribute undesirable stress differentials and distorts the tape as it passes thereabout from one coaxial level to the other.

SUMMARY OF THE INVENTION

A preferred configuration would have the magnetic tape naturally assuming the desired inclined path from the lower level to the upper level of the coaxial-reel cassette without being stressed differentially across its width, even as the tape passes around the surfaces of the guide posts. Furthermore, the tape would naturally assume a path at the level of each respective reel when withdrawn from the cassette. Not only are these requirements different, but meeting one by the usual proposals tends to counteract the other, since distortion-free guiding designed for one path tends to aggravate distortion in the other path. The invention proposes to mutually satisfy these conflicting requirements with minimal use of space in the cassette.

The invention basically provides for a guide post having two surfaces, the first surface being formed from a right circular cylinder and the second surface being formed from an obliquely disposed circular cone. When the tape is within the cassette, it passes over both surfaces such that the second surface orients the tape so that it assumes an inclined path from one reel to the other without being stressed differentially across its width from passage over the guide post. The tape, when pulled out of the cassette, is withdrawn along a path so disposed as to pass over only the first surface, which then orients the tape so that it assumes a distortion-free path at the level of the respective reel to which it is attached.

The invention as described to this point accommodates a tape path outside of the cassette when the tape is withdrawn substantially straight away from the cassette. It was additionally found that a greater variety of tape paths outside of the cassette could be accommodated if the guide post and its associated surfaces were rotated sufficiently for a given tape path such that the second surface would not touch the tape. Therefore, the second surface would clear the tape at different angles of guide post rotation for different paths. Consequently, the invention makes provision for disposing the surfaces such that both surfaces contact the tape when the tape is contained within the cassette and rotating the post such that only the first surface contacts the tape when it is withdrawn from the cassette. The rotation preferably occurs as the tape is withdrawn from the cassette.

In another aspect of the invention, the first surface is provided with at least one flange which defines the edge of the tape path around the first surface. With the path so defined, guiding is enhanced whether the tape is in or out of the cassette.

BRIEF DESCRIPTION OF THE DRAWINGS

The invention will be described with reference to the figures, wherein:

FIG. 1 is a plan view schematically illustrating one embodiment of the invention;

FIG. 2 is a cross-sectional view of the front face of the cassette taken substantially along line 2—2 of FIG. 1;

FIGS. 3 and 4 are front and side elevation views of one of the cassette guides as viewed in FIG. 1;

FIG 5 is a top view of the other cassette guide illustrated in FIG. 1;

DESCRIPTION OF THE PREFERRED EMBODIMENTS

Figure 6:
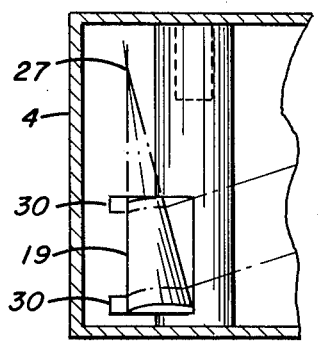
FIGS. 6 and 7 are front and side elevation views of the cassette guide as viewed in FIG. 5.

Because tape recorders are well known, the present description will be directed in particular to elements forming part of, or cooperating more directly with, the present invention. Recorder elements not specifically shown or described may take various forms well known to those skilled in the art.

Referring specifically to FIG. 1, there are shown schematically the parts of a helical video recorder which are sufficient for an understanding of the present invention. A helical tape recorder 2 is provided with space on its playing deck for accepting a coaxial-reel cassette 4. A supply reel 6 is coaxially disposed at a lower level in the cassette 4 with relation to a takeup reel 8 disposed at an upper level. For sake of clarity, the reels 6 and 8 are shown in FIG. 1 as having different diameters. The respective arrangement of the reels is illustrated in FIG. 2. Each reel 6 and 8 is mounted in the cassette 4 for rotation around a coaxial axis 10. A magnetic tape 12 leaves the supply reel 6 and passes around guide posts 14 and 16 during the course of its travel to the takeup reel 8.

As better shown in FIGS. 3 and 4, the guide post 16 has two tape-contacting guide surfaces formed thereon: a conical surface 18 formed from a section of a frustum of an oblique circular cone and a cylindrical surface 20 formed from a section of a right circular cylinder. The conical surface 18 has an axis 22 obliquely directed both with respect to an axis 24 of the cylindrical surface 20 and the axis 10 of the coaxial reels 6 and 8. The cylindrical surface 20 is disposed on the guide post 16 at the level of the takeup reel 8. Furthermore, the tape 12 is introduced to the conical surface 18 such that it is tangent to the conical surface 18 along a line 26. The significance of this orientation is that the plane and direction of travel of the tape 12 is changed as it passes around the conical surface 18 without incurring a distribution of stress differentials on the tape 12. Thus, while the angle of incline of the tape 12 is changed, as is necessary, the tape 12 still enters and exits from the conical surface 18 in a vertical plane. The cone from which the conical surface 18 is taken defines an apex 28, shown in broken lines, which points generally toward the level of the supply reel 6.

Figure 7:
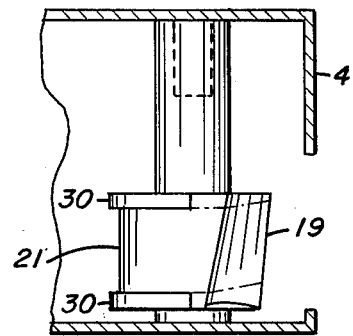
Figure 8:
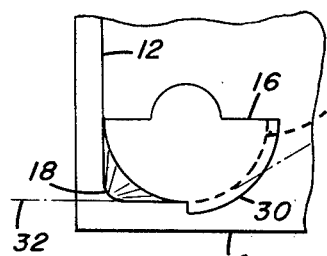
FIG. 8 is a top view of the guide as viewed in FIGS. 3 and 4.

FIGS. 6 and 7 show elevation views of the guide post 14. A conical surface 19 and a cylindrical surface 21 are provided on the guide post 14 for purposes of guiding the tape 12. The cylindrical surface 21 is similar to the cylindrical surface 20 described heretofore except that it is oriented in line with the supply reel 6. The conical surface 19 is also similar to the conical surface 18 described above except that it defines an apex 27, shown in broken lines, which points generally toward the takeup reel 8. Additionally, the conical surface 19 is oriented to receive the tape 12 along the level of the supply reel 6. The cylindrical surfaces 20 and 21 are provided with flanges 30 which are spaced apart a distance equivalent to the width of the tape 12. The flanges 30, though formed on the cylindrical parts of the guides 14 and 16, prevent lateral wandering of the tape 12, while the tape 12 rides across the conical surfaces 18 and 19, or out of the cassette. Referring now to FIGS. 5 and 8, top views of the guide posts 14 and 16, respectively, are shown. The dotted path 32, to be hereafter described in more detail, represents the path of the tape 12 when withdrawn from the cassette 4. The solid line 32' shows the tape 12 passing between the two posts 14 and 16 from the supply reel 6 to the takeup reel 8.

Referring again to FIG. 1, the cassette has a cutaway front face 34, sometimes referred to hereinafter as a window, which is so disposed as to permit the positioning of a pair of tapered threading guides 36 and 38, sometimes referred to hereinafter as tape wrapping guides, behind the tape 12 and to allow the tape 12 to be withdrawn straight away from the guides 14 and 16. The threading guides 36 and 38 are mounted on coaxial gearing, not specifically described but generally designated by gear assembly 40, for rotational movement around an axis 42. A recording drum 44 is also provided which supports at least one recording and/or play head 46, aslo rotatable about the axis 42. The path of the head 46 is slanted with respect to the tape 12 so that helical recording may take place when the tape 12 is wrapped around the drum 44 by the movement of the threading guides 36 and 38. A movable tape positioning guide 48 is adapted to move through a track 50 (shown by broken lines) by means of suitable drive elements (not shown) coupled to the threading guides 36 and 38. A pinch roller 52 is also adapted to move through a track 54 (shown by broken lines) in response to the actuation of the threading guies 36 and 38. At the end of its travel, the pinch roller 52 forces the tape 12 into driving engagement with a capstan 56.

To commence the threading operation, the tape threading guides 36 and 38 rotate from their unthreaded position about the axis 42, withdrawing the tape 12 through the window 34, until they reach the threaded positions 36' and 38' (shown by broken lines). In this position, the tape 12 is helically wrapped around the drum 44 so that the head 46 travels an oblique path across the tape 12. A copending U.S. application Ser. No. 606,994, in the name of Douglass L. Blanding, assigned to the same assignee as the present invention, discloses a suitable drive means for rotating the tape threading guides 36 and 38 from their unthreaded position to their threaded position; in the threaded position a suitable switch or motor control unit disables the drive means. The reverse operation, from the threaded to the unthreaded position, may be accomplished by reverse gearing (not shown).

In coordination with the movement of the threading guides 36 and 38, the positioning guide 48 and the pinch roller 52 move through their respective tracks 50 and 54 to the positions shown at 48' and 52', respectively. The position 48' of the guide 48 relative to the cassette 4 is selected so as to bring the tape 12 straight away from the guide 16, substantially in a plane perpendicular to the plane of travel of the tape 12 across the front face of the cassette 4. The positioning of the pinch roller 52 and the capstan 56 similarly directs the tape straight away from the guide 14. The tape 12, passing along the path 32 (indicated by broken lines in FIG. 1), therefore is guided only by the cylindrical surfaces 20 and 21 of guide posts 16 and 14, respectively. Furthermore, sideways wandering of the tape 12 is inhibited by the flanges 30.

When the tape threading guides 36 and 38, the tape positioning guide 48, and the pinch roller 52 resume their solid-line positions illustrated in FIG. 1, the tape 12 is wound back into the cassette until it passes from the guide post 14 across the window 34 to the guide post 16. The significance of this orientation is that the tape 12 now is guided by the composite conical and cylindrical surfaces 18, 19, 20, and 21, whereas the tape 12 was guided only by the cylindrical surfaces 20 and 21 when it was withdrawn from the cassette. In either path, the plane of the tape 12 toward and away from the guides 14 and 16 is always maintained parallel to the rotation axis 10 of the coaxial reels 6 and 8. As a result, the tape naturally assumes the desired inclined path from the lower level to the upper level of the coaxial-reel cassette when guided by the composite surfaces. Furthermore, the tape naturally assumes a path at the level of each respective reel when guided by the cylindrical surfaces only. "Natural", in this context, describes the passage of the tape 12 around the guide posts 14 and 16 without being stressed or distorted differentially across its width.

Figure 9:
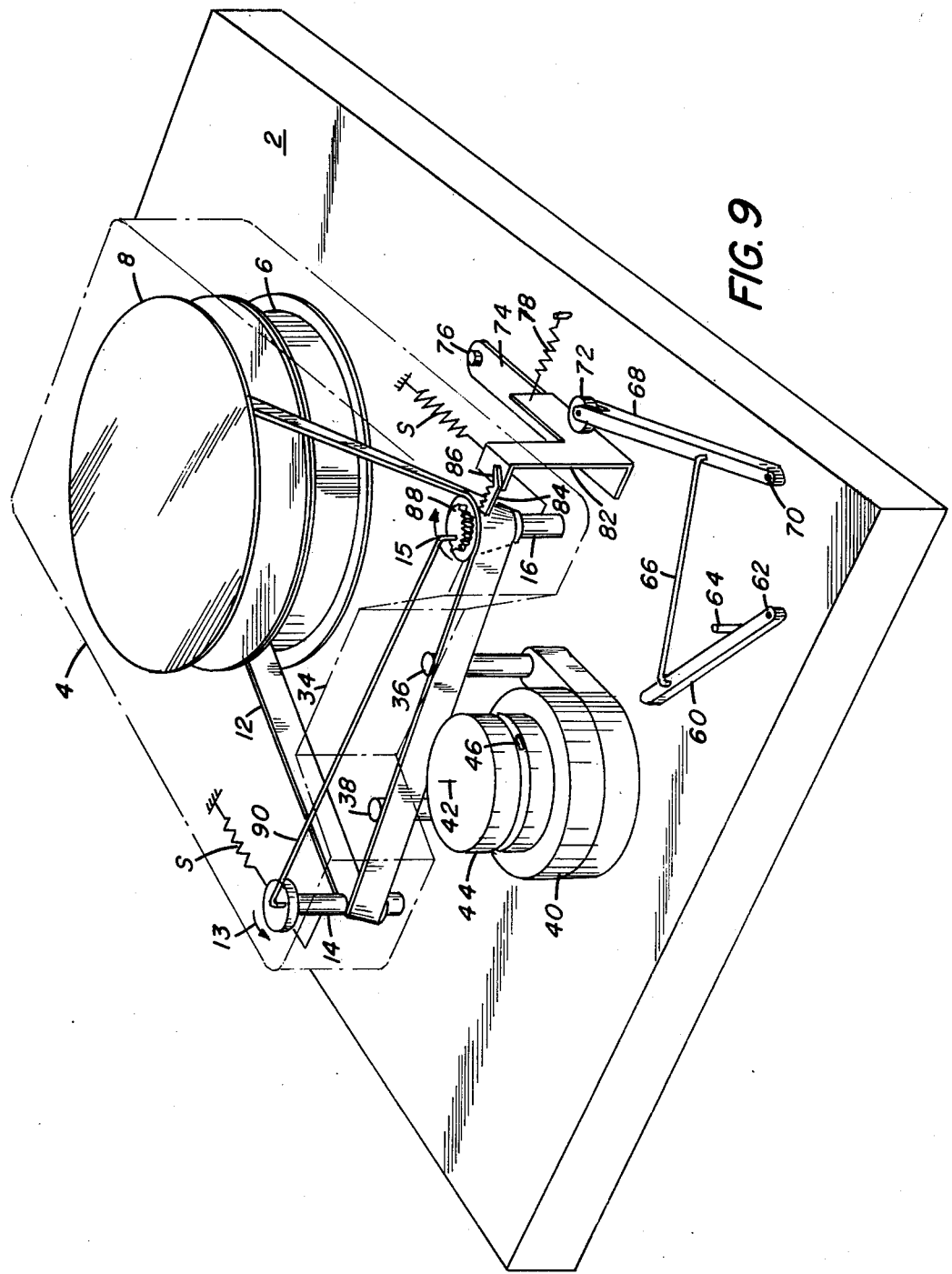
FIG. 9 is a perspective view of another embodiment of the invention.

Referring next to FIG. 9, another embodiment of the invention is shown wherein the basic difference lies in having the guides 14 and 16 rotatable in the directions of arrows 13 and 15, respectively, by a lever and gear assembly. A first lever 60 is rotatable around a pivot axis 62, except as restrained by a stop 64. A linkage 66 connects the lever 60 with a second lever 68 which pivots around an axis 70. The other end of the lever 68 is terminated in a fixture for rotatably mounting a roller 72. A third lever assembly 74 pivots around an axis 76, as urged by a spring member 78. The lever assembly 74 further includes a cam surface 80 which rides against the roller 72 and an extension 82 on which is mounted a rack 84 by means of a flexible arm 86. The rack 84 has gear teeth which are adapted to mesh with a pinion 88 secured for rotation on and together with the post 16. A linkage 90 is attached between the guide posts 16 and 14 in such a manner as to rotate the guide post 14 in the direction of the arrow 13 when the guide post 16 is rotated in the direction of the arrow 15. Springs S,schematically depicted in FIG. 9, rotationally bias the guide posts 14, 16 so that they present their respective conical surfaces 19, 18 for cooperation with the tape when the cassette 4 is not within the recorder 2.

Figure 10:
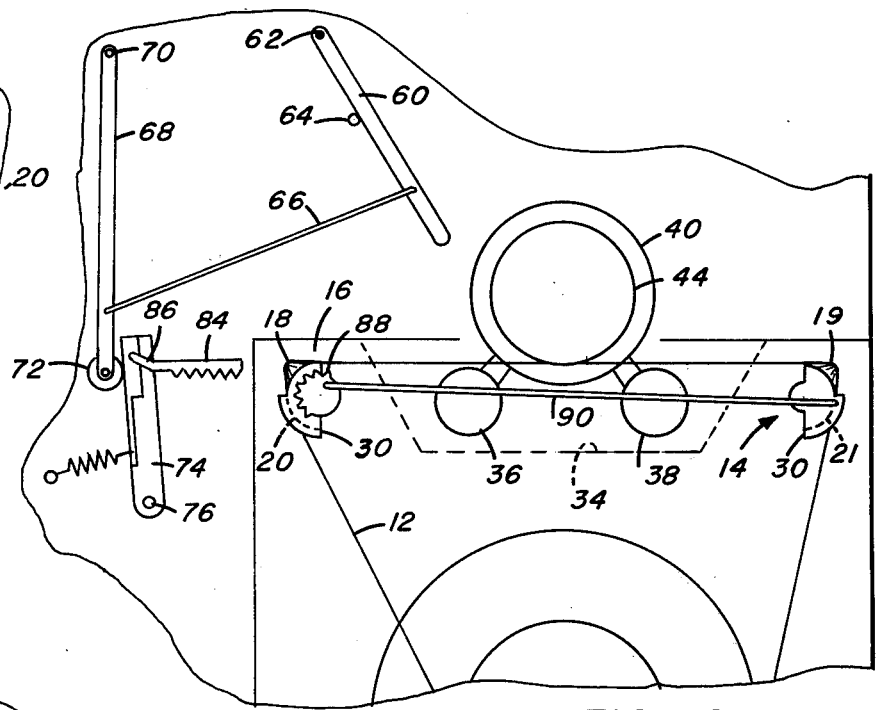
FIGS. 10 and 11 are fragmentary top views illustrating two modes for the apparatus as pictured in FIG. 9.
Figure 11:
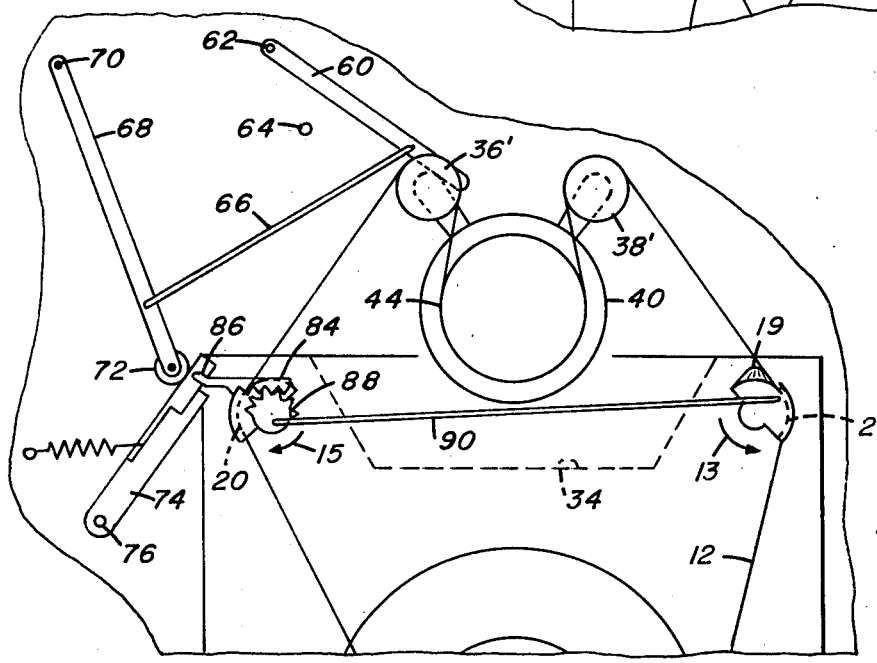

FIGS. 10 and 11 illustrate the operational positions of the lever and gear assembly of FIG. 9 when the tape 12 is within the cassette 4 and when the tape 12 is wrapped around the drum 44 for purposes of helical recording, respectively. FIG. 10 is comparable to the solid-line position indicated in FIG. 1, particularly in that the tape passes over the composite conical and cylindrical surfaces 18, 19, 20 and 21. Unlike the straightaway broken-line position 32 of tape 12 in FIG. 1, the tape 12 in FIG. 11 is drawn away from the cassette 4 at an acute angle with the window 34. To properly orient the cylindrical surfaces 21 and 20 opposite the tape 12 as it rounds the guide posts 14 and 16, each post 14 and 16 is disposed to rotate an amount sufficient to present only the cylindrical surfaces 21 and 20 to the tape. When the tape threading guides 36 and 38 rotate to their threaded positions 36' and 38', the base of the guide 36 cams the lever 60 counterclockwise about the pivot 62. The linkage 66 transmits this rotational force to the lever 68 which in turn rotates counterclockwise about the pivot 70. The roller 72, therefore, cams the lever assembly 74 clockwise, causing the gear teeth on the rack 84 to engage with the gear teeth on the pinion 88. Flexure of the arm 86 allows the rack 84 to rotate the pinion 88 and the post 16 in the direction of the arrow 15 until the conical surface 18 rides free of the tape 12. The linkage 90 causes the post 14 to rotate in the direction of the arrow 13 until the conical surface 19 also rides free of the tape 12. Thereafter, the tape 12 is suitably oriented to the vicinity of the recording drum 44 by the cylindrical surfaces 20 and 21 and their associated flanges 30.

The amount of rotation of the guides 14 and 16 is dependent upon the amount of angle which the path of the tape 12 makes with the face of the cassette 4 when it is withdrawn through the window 34. Basically, the amount of rotation necessary will decrease as the path of the tape 12 approaches closer to the straightaway path illustrated in FIG. 1. However, regardless of the amount of needed rotation, the plane of the tape 12 toward and away from the guides 14 and 16 is always maintained parallel to the rotation axis 10 of the coaxial reels 6 and 8 whether the tape 12 is in or out of the cassette 4.

The invention has been described in detail with particular reference to presently preferred embodiments thereof, but it will be understood that variations and modifications can be effected within the spirit and scope of the invention.

What is claimed is:

1. For use in a tape cassette of the type having first and second rotatable reels, the cassette being useful with a helical scan recorder, the cassette having a window out of which tape may be withdrawn and helically wrapped around a recording drum, the cassette further having at least one guide post disposed in the path of travel of the tape as it passes from one of the reels to the other, the improvement wherein the post comprises:
   first and second contiguous guiding surfaces, said first surface being part of a cylinder and said second surface being part of a cone, said post being so oriented that the tape rides in guiding contact with said cylindrical part whether or not the tape is withdrawn out of the cassette window, and said second surface being so oriented on the post that the tape rides in guiding contact with said conical part only when the tape is not withdrawn out of the cassette window.

2. A cassette, for use in a tape recorder of the type wherein magnetic tape from the cassette is directed around a recording drum which supports recording heads that helically scan the tape, the cassette having a supply reel and a takeup reel coaxially mounted with respect to each other, whereby tape is supplied by the supply reel at a first level and taken up by the takeup reel at a second level, the recorder further having at least two tape positioning guides for guiding the tape outside of the cassette when it is withdrawn therefrom and wrapped about at least a portion of the periphery of the recording drum, the improvement wherein the cassette comprises:
   first and second guide posts mounted in the cassette for orienting the tape from the first level to the second level along an inclined path when the tape is not withdrawn from the cassette, and for guiding the tape from the reels to the tape positioning guides when the tape is withdrawn from the cassette; and
   each said guide post having a conical tape guiding surface for orienting the tape along said inclined path between the first and second levels and for maintaining the plane of the tape substantially parallel to the rotation axis of the reels during travel of the tape toward and away from said first and second posts, and each said guide post having a cylindrical surface for guiding the tape from the reels to the tape positioning guides and for maintaining the plane of the tape therebetween substantially parallel to the rotation axis of the reels.

3. A cassette for use with a helical scan video tape recorder of the type wherein a magnetic tape is helically wrapped around a recording drum by at least one movable tape wrapping guide, wherein the tape is wound between two coaxial reels in a cassette and across an open window therein, wherein the tape threading guide is adapted to withdraw the tape from the cassette through the window and to wrap the tape around the recording drum, wherein the cassette has at least one post mounted therein to guide the tape either directly between the reels or through the window, the improvement wherein the post comprises:
   first and second contiguous parts, said first part having a cylindrical guiding surface which is so disposed within the cassette as to guide the tape whether or not the tape is withdrawn through the window and said second part being a portion of a cone having an axis obliquely disposed with respect to the axis of the reels for guiding the tape between the coaxial reels without distortion thereof when the tape is not withdrawn through the window.

4. The apparatus as claimed in claim 3 including the improvement wherein the cassette comprises means for rotating said second part of the post out of guiding contact with the tape when the tape is withdrawn through the cassette window.

5. For use in a helical scan video tape recorder of the type wherein a magnetic tape is helically wrapped around a recording drum by at least one tape wrapping guide, the recorder being of the type that cooperates with a cassette wherein the tape is wound between a first reel and a second reel which rotate around a common axis at a first and second level respectively, the tape wrapping guide being adapted to withdraw the tape from the cassette through a window therein and wrap the tape around the recording drum, the cassette having at least one post mounted therein to guide the tape either from one reel to the other reel or through the window, the improvement wherein the post comprises:

first and second parts, said first part having a cylindrical guiding surface for directing the tape toward and away therefrom along planes parallel to the rotation axis of the reels whether the tape is wound between the first and second reels or withdrawn through the window, said second part having a conical guiding surface for orienting the tape between the first and second levels of the cassette when the tape is not withdrawn through the window, and said conical surface obliquely disposed within the cassette with respect to said cylindrical surface for receiving the tape from said cylindrical surface and for guiding the tape between the first and second levels along a plane which is parallel to the rotation axis of the reels.

6. The apparatus as claimed in claim 5 including the improvement wherein the cassette comprises means for rotating the post and for maintaining only said first part in guiding contact with the tape when the tape is withdrawn through the cassette window.

7. The apparatus as claimed in claim 6 wherein said cylindrical surface further comprises at least one flange located along the path of travel of one edge of the tape for preventing lateral movement thereof.

8. A cassette for use in a helical scan video recorder, comprising:
 a first reel for providing a length of magnetic tape;
 a second reel coaxially mounted with respect to said first reel for taking in said length of magnetic tape;
 at least one tape guide post mounted in the cassette and over which said length of magnetic tape passes, said post having first and second contiguous guiding surfaces, said first guiding surface comprising a part of a cylinder and said second guiding surface comprising a part of a cone having an axis obliquely disposed with respect to the axis of the reels;
 a window in the cassette for withdrawing said tape therethrough;
 means for rotating said post, whereby said first and second guiding surfaces guide said tape when said tape is translated directly between said first and second reels and whereby only said first guiding surface guides said tape when said tape is withdrawn through said window.

9. In combination with a cassette of the type useful with a helical scan video recorder, the cassette having a pair of coaxial reels, the reels having a span of tape extending therebetween, and the cassette further having a window across or through which the tape is adapted to extend or be withdrawn, the apparatus comprising:
 a guide post supported for rotation within the cassette, said post having first and second differently-shaped surfaces for guiding the tape either across or through the window;
 means for biasing the rotation of said post for cooperation of both said first and second guide surfaces with the tape; and
 means for rotating, against said bias, said post for cooperation of said second guide surface with the tape when the tape is withdrawn through the window, said first and second surfaces being, respectively, substantially conical and cylindrical, said first surface further having an axis which disposes it obliquely with respect to said second surface.

* * * * *